(12) United States Patent
Wang et al.

(10) Patent No.: US 8,845,189 B2
(45) Date of Patent: *Sep. 30, 2014

(54) DEVICE IDENTIFICATION AND TEMPERATURE SENSOR CIRCUIT

(75) Inventors: Shen Wang, Webster, NY (US); Edward T. Nelson, Pittsford, NY (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/238,003

(22) Filed: Sep. 21, 2011

(65) Prior Publication Data

US 2013/0051427 A1      Feb. 28, 2013

Related U.S. Application Data

(60) Provisional application No. 61/529,287, filed on Mar. 31, 2011, provisional application No. 61/529,288, filed on Aug. 31, 2011.

(51) Int. Cl.
*G01K 1/08* (2006.01)
*G01N 31/00* (2006.01)
*H04N 5/232* (2006.01)
*G01K 7/01* (2006.01)

(52) U.S. Cl.
CPC . *H04N 5/232* (2013.01); *G01K 7/01* (2013.01)
USPC ............................................ 374/152; 702/30

(58) Field of Classification Search
USPC ......................................................... 374/152
See application file for complete search history.

(56) References Cited

U.S. PATENT DOCUMENTS

| | | | |
|---|---|---|---|
| 4,102,194 A | 7/1978 | Eng | |
| 4,795,918 A | 1/1989 | Menon et al. | |
| 5,441,520 A | 8/1995 | Olsen et al. | |
| 5,508,740 A * | 4/1996 | Miyaguchi et al. | 348/244 |
| 5,880,584 A | 3/1999 | Arai et al. | |
| 6,002,244 A * | 12/1999 | Wrathall | 323/315 |
| 6,647,140 B1 * | 11/2003 | Wang et al. | 382/162 |
| 6,742,349 B1 | 6/2004 | Kawai et al. | |
| 6,815,643 B2 | 11/2004 | Der Ropp | |
| 6,941,536 B2 * | 9/2005 | Muranaka | 716/110 |
| 6,960,753 B2 * | 11/2005 | Cheung | 250/208.2 |
| 7,024,539 B2 * | 4/2006 | Bresemann et al. | 712/36 |
| 7,187,961 B2 | 3/2007 | Yamashita et al. | |
| 7,262,469 B2 | 8/2007 | Makita | |
| 7,265,566 B2 | 9/2007 | Graf | |
| 7,271,780 B2 * | 9/2007 | Cok | 345/1.1 |
| 7,369,167 B2 | 5/2008 | Bruce et al. | |
| 7,385,491 B2 * | 6/2008 | Doi | 340/440 |

(Continued)

*Primary Examiner* — Lisa Caputo
*Assistant Examiner* — Nasir U Ahmed
(74) *Attorney, Agent, or Firm* — Howard & Howard Attorneys PLLC

(57) ABSTRACT

An integrated circuit includes a device identification circuit and a temperature sensor diode connected in parallel from a common node. The device identification circuit includes a resistor connected to a diode-connected transistor. The device identification circuit and the temperature sensor diode are adapted to not be simultaneously operating in an ON state. A first voltage is applied to the common node to place the device identification circuit in an ON state and place the temperature sensor diode in an OFF state to identify the integrated circuit. A second voltage is applied to the common node to place the device identification circuit in an OFF state and place the temperature sensor diode in an ON state to determine a temperature of the integrated circuit.

24 Claims, 8 Drawing Sheets

(56) References Cited

U.S. PATENT DOCUMENTS

| | | | |
|---|---|---|---|
| 7,420,358 B2 * | 9/2008 | Byeon et al. | 323/314 |
| 7,480,588 B1 * | 1/2009 | Walker | 702/132 |
| 7,508,225 B2 | 3/2009 | Taylor | |
| 7,627,455 B2 | 12/2009 | Lenz et al. | |
| 7,660,998 B2 * | 2/2010 | Walmsley | 713/189 |
| 7,691,666 B2 * | 4/2010 | Levy et al. | 438/104 |
| 7,728,401 B2 | 6/2010 | Takatori | |
| 7,786,847 B2 | 8/2010 | Kang | |
| 7,787,034 B2 * | 8/2010 | Ying et al. | 348/247 |
| 7,852,138 B2 | 12/2010 | Kuusilinna et al. | |
| 7,898,316 B2 | 3/2011 | Pahr et al. | |
| 8,029,187 B2 | 10/2011 | Taylor et al. | |
| 8,215,530 B2 | 7/2012 | Milliman | |
| 8,303,074 B2 * | 11/2012 | Burke | 347/19 |
| 8,330,476 B2 | 12/2012 | Chan et al. | |
| 8,415,813 B2 | 4/2013 | Wang et al. | |
| 8,445,902 B2 | 5/2013 | Sato et al. | |
| 8,489,782 B2 | 7/2013 | Chadbourne et al. | |
| 2006/0067592 A1 * | 3/2006 | Walmsley et al. | 382/303 |
| 2006/0284915 A1 | 12/2006 | Han | |
| 2007/0262980 A1 | 11/2007 | Ying et al. | |
| 2008/0186395 A1 * | 8/2008 | Bruce et al. | 348/308 |
| 2008/0198898 A1 * | 8/2008 | Taylor et al. | 374/163 |
| 2012/0326736 A1 | 12/2012 | Chadbourne et al. | |
| 2013/0049777 A1 | 2/2013 | Wang et al. | |
| 2013/0051428 A1 | 2/2013 | Wang | |

* cited by examiner

DEVICE IDENTIFICATION AND TEMPERATURE SENSOR CIRCUIT

CROSS-REFERENCE TO RELATED APPLICATIONS

This application claims the benefit of U.S. Provisional Application 61/529,287 filed on Aug. 31, 2011 and U.S. Provisional Application 61/529,288 filed on Aug. 31, 2011.

TECHNICAL FIELD

The present invention relates generally to integrated circuits, and more particularly to an integrated circuit that includes a device identification and temperature sensor circuit.

BACKGROUND

Performance of an integrated circuit, such as an image sensor, can be dependent on the temperature. For example, dark current inside an image sensor is highly temperature dependent. The dark current will increase with an increase of temperature and higher dark current degrades the performance of the image sensor. Higher dark current impacts the dynamic range of the image sensor, the dark reference level, and can cause various defects in captured images. If the temperature becomes too high, the sensor is susceptible to permanent damage.

One conventional technique for measuring the temperature of an image sensor is to mount a thermal couple on the package of the image sensor, either at the front side or at the back side of the package, depending on how the sensor is mounted on the circuit board. The thermal couple can occupy a lot of space and make a camera or other image capture device bulky. Also, over time, the epoxy used to affix the thermal couple to the package can age and become loose. And the temperature typically cannot be measured until the loose epoxy is repaired.

SUMMARY

An integrated circuit includes a device identification circuit and a temperature sensor diode connected in parallel. The device identification circuit includes a resistor connected to a diode-connected transistor. The device identification circuit and the temperature sensor diode are adapted to not be operating in an ON state simultaneously. The resistor is connected between the diode-connected transistor and a reference voltage. The temperature sensor diode is connected to either the same reference voltage or a different reference voltage. The device identification circuit has a first polarity and the diode-connected transistor a different second polarity, where polarity is defined as a positive voltage change or a negative voltage change relative to the respective reference voltage.

A system to identify a device and to measure a temperature of the device includes a power supply, a device identification circuit, and a temperature sensor diode. The device identification circuit includes a resistor connected between a diode-connected transistor having a first polarity and the first reference voltage. The temperature sensor diode has a second polarity and is connected between the power supply and a second reference voltage. The power supply can be disposed, for example, in an image capture device and the device identification circuit and the temperature sensor diode in an image sensor. A processor included in the image capture device can use the device identification circuit to identify the type of image sensor. The processor can also continuously or periodically monitor or determine the temperature of the image sensor.

A method for identifying an integrated circuit and determining a temperature of the integrated circuit uses a circuit that includes a device identification circuit having a resistor connected to a diode-connected transistor and further includes a temperature sensor diode connected in parallel with the device identification circuit. The device identification circuit and the temperature sensor diode are connected to a common node. The method includes applying a first voltage to the common node to place the device identification circuit in an ON state and place the temperature sensor diode in an OFF state to identify the integrated circuit. A second voltage can be applied to the common node to place the device identification circuit in an OFF state and place the temperature sensor diode in an ON state to determine a temperature of the integrated circuit.

The integrated circuit can be identified by determining a resistance value of the resistor included in the device identification circuit, and determining a corresponding resistance value to the determined resistance value. The corresponding resistance value can be included in known resistance values for different integrated circuits.

The temperature of the integrated circuit can be determined by measuring a current value through the temperature sensor diode, comparing the measured current value against a plurality of predetermined current values determined at different temperatures, and determining the temperature of the integrated circuit by determining one of the predetermined current values in the plurality of current values that correspond with the measured current value.

The temperature of the integrated circuit can be determined by measuring a voltage value across the temperature sensor diode, comparing the measured voltage value against a plurality of predetermined voltage values determined at different temperatures, and determining the temperature of the integrated circuit by determining one of the predetermined voltage values in the plurality of voltage values that correspond with the measured current value.

ADVANTAGEOUS EFFECT

The present invention implements both a device identification feature and a temperature sensor feature on a single integrated circuit without introducing an extra bond pad or package pin. Manufacturers of products that currently use either one of the features can utilize both features with minimum modifications to the current electronics. Integrated circuits, such as image sensors, having unique features can use the device identification feature to automatically identify an integrated circuit and implement or optimize settings, programs, and operating conditions based on the specification of the identified integrated circuit. The device identification feature allows manufacturers to design a single system that is able to work for different integrated circuits or devices. Additionally, the temperature sensor feature can be used to periodically or continuously monitor the temperature of the integrated circuit and prevent device failures when the temperature of the integrated circuit becomes too high. It can also be used to perform some image improvement algorithms such as, for example, dark current subtraction at different temperatures.

BRIEF DESCRIPTION OF THE DRAWINGS

Embodiments of the invention are better understood with reference to the following drawings. The elements of the drawings are not necessarily to scale relative to each other.

DETAILED DESCRIPTION

Figure 1:
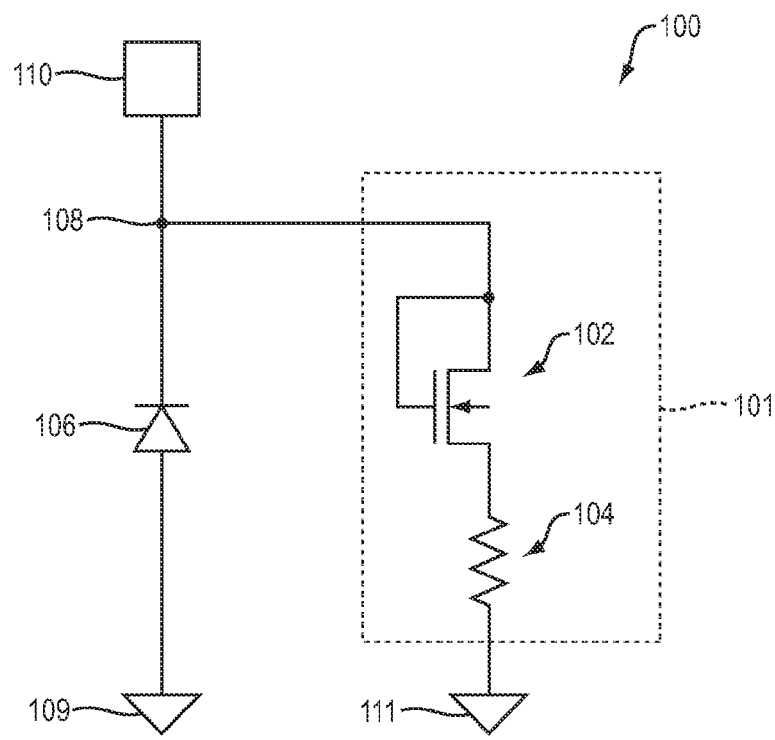
FIG. 1 is a schematic diagram of a device identification and temperature sensor circuit in an embodiment in accordance with the invention.

Throughout the specification and claims the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected or an indirect connection through one or more passive or active intermediary devices. The term "circuit" means either a single component or a multiplicity of components, either active or passive, that are connected together to provide a desired function. The term "signal" means at least one current, voltage, or data signal.

Additionally, directional terms such as "on", "over", "top", "bottom", are used with reference to the orientation of the Figure(s) being described. Because components of embodiments of the present invention can be positioned in a number of different orientations, the directional terminology is used for purposes of illustration only and is in no way limiting. When used in conjunction with layers of an integrated circuit wafer or corresponding integrated circuit, the directional terminology is intended to be construed broadly, and therefore should not be interpreted to preclude the presence of one or more intervening layers or other intervening integrated circuit features or elements. Thus, a given layer that is described herein as being formed on or formed over another layer may be separated from the latter layer by one or more additional layers.

And finally, the term "substrate" is to be understood as a semiconductor-based material including, but not limited to, silicon, silicon-on-insulator (SOI) technology, doped and undoped semiconductors, epitaxial layers formed on a semiconductor substrate, and other semiconductor structures.

Referring to the drawings, like numbers indicate like parts throughout the views.

FIG. 1 is a schematic diagram of a device identification and temperature sensor circuit in an embodiment in accordance with the invention. Device identification circuit 101 is connected in parallel with temperature sensor diode 106. Device identification circuit 101 and temperature sensor diode 106 are connected to common node 108. Device identification circuit 101 and temperature sensor diode 106 are also connected to reference voltages 109, 111. The reference voltages can be one common voltage, such as ground, or two different voltages.

Device identification circuit 101 includes diode-connected transistor 102 connected in series with resistor 104. Temperature sensor diode 106 is implemented as a PN junction diode and diode-connected transistor 102 as a diode-connected metal-oxide-semiconductor field-effect transistor (MOSFET) in an embodiment in accordance with the invention. Additionally, the impedance of diode-connected transistor 102 is smaller than the resistance value of resistor 104 in an embodiment in accordance with the invention.

The anode of temperature sensor diode 106 is connected to the reference voltage 109 which can be ground as shown or other reference voltages. The cathode is connected to common node 108. Common node 108 is connected to bond pad 110. The forward current across diode 106 is dependent upon temperature. The Shockley diode equation relates the diode current I of a PN junction diode to the diode voltage V. This relationship is known as the diode I-V characteristic, which can be characterized by the equation, $$I = I_s \left( e^{\frac{qV}{nkT}} - 1 \right) \qquad \text{Equation 1}$$

where I is the forward current through the diode, $I_s$ is the reverse bias saturation current, V is the voltage across the diode, T is temperature of the PN junction in Kelvins, and n is a junction constant (typical around 2 for diode). The letters q and k represent constants, where k is Boltzmann's constant (1.38E-23 joules/Kevin) and q is the magnitude of charge on an electron (1.6E-19 coulombs).

The reverse saturation current can be defined by the equation, $$I_s = I_c e^{-\frac{qE_g}{nkT}} \qquad \text{Equation 2}$$

where $I_c$ is a current constant and $E_g$ is the diode material bandgap (1.12 eV for silicon).

Figure 2:
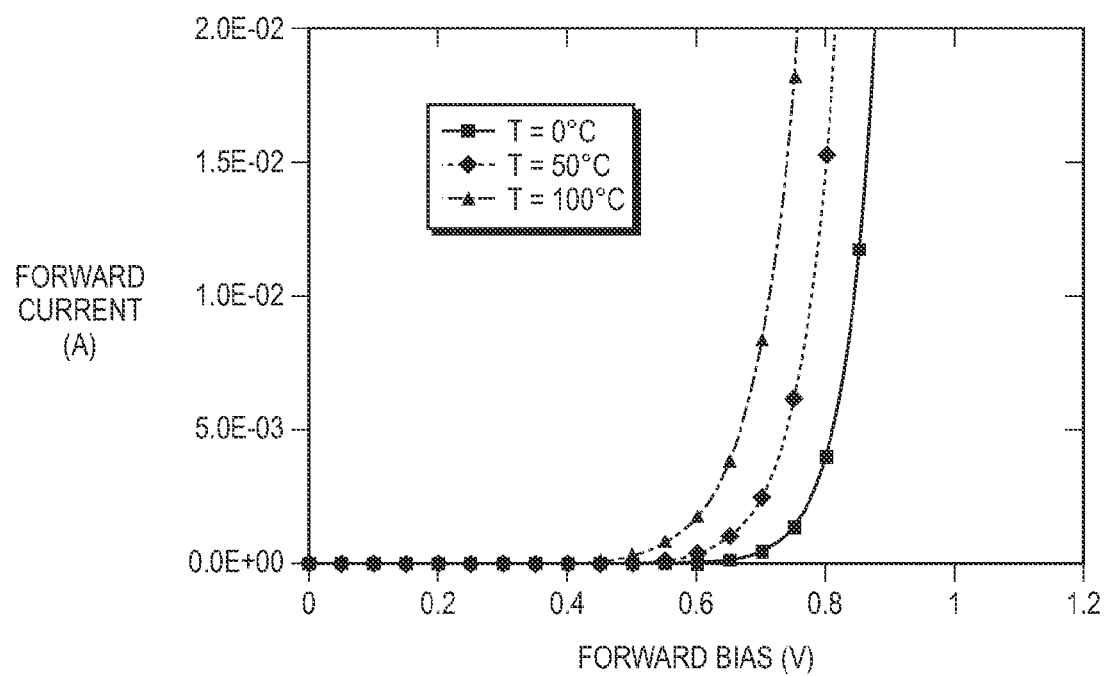
FIG. 2 illustrates examples of I-V curves of a PN-junction diode at different temperatures in an embodiment in accordance with the invention.

From Equations 1 and 2, diode I-V curves versus temperature can be calculated and plotted, as shown in FIG. 2. Three I-V curves for temperatures of 0° C., 50° C., and 100° C. are illustrated in FIG. 2. The three I-V curves show the forward current through a diode increases with temperature.

Figure 3:
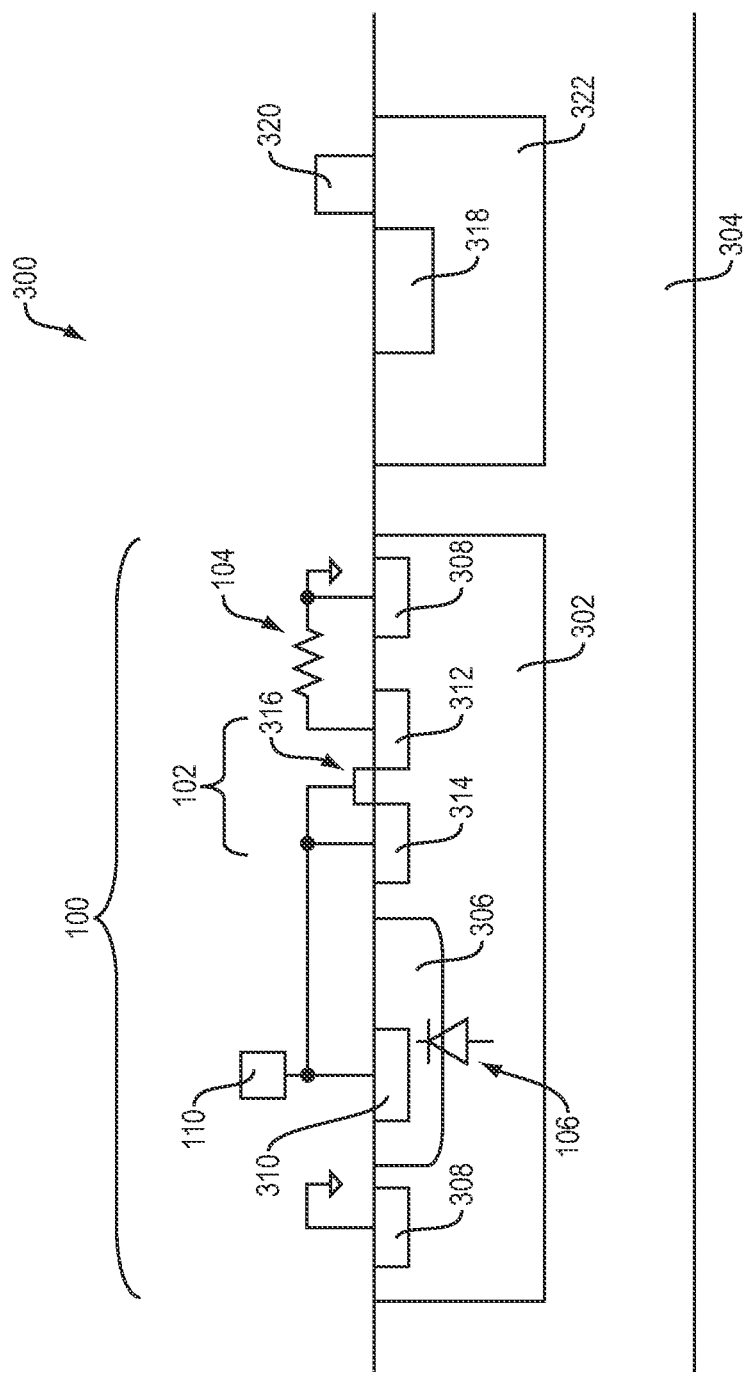
FIG. 3 is a cross-sectional view of a portion of a first integrated circuit that includes device identification and temperature sensor circuit 100 in an embodiment in accordance with the invention.

Referring now to FIG. 3, there is shown a cross-sectional view of a first integrated device including device identification and temperature sensor circuit 100 in an embodiment in accordance with the invention. A well 302 is disposed in substrate 304. Well 302 is a p-type well and substrate 304 an n-type substrate in an embodiment in accordance with the invention.

Temperature sensor diode 106 is formed between p-type well 302 and an n-type well 306 disposed in p-type well 302. The anode of the diode 106 is connected to a ground through a contact (not shown) in p-select region 308. The cathode of diode 106 is connected to bond pad 110 through a contact in n-select region 310. N-select region 310 is disposed in n-type well 306.

Diode-connected transistor 102 is also built in p-type well 302 with the source region 312 and drain region 314 of transistor 102 disposed in p-type well 302. Source region 312 and drain region 314 are n-type regions in an embodiment in accordance with the invention. The gate 316 of diode-connected transistor 102 is tied to drain region 314, and both the gate 316 and drain region 314 are connected to bond pad 110. Source region 312 is connected to one end of resistor 104. The other end of resistor 104 is connected to the same ground that is connected to temperature sensor diode 106 through a contact in p-select region 308. Resistor 104 is made of polysilicon material in an embodiment in accordance with the invention.

In the illustrated embodiment, one or more additional circuits or components 318, 320 are constructed in or on well 322. Well 322 is a p-type well in an embodiment in accordance with the invention. A current flows through p-type well 302 into n-type well 306 when diode 106 is forward-biased. The size of temperature diode 106 can be much larger than the size of the transistor 102 to minimize the impact of the current flow from the transistor 102 when the bond pad is applied a negative voltage. The p-type wells 302 and 322 can be formed separately to prevent the diode current from affecting the performance of the one or more additional circuits or components 318, 320. In addition, diode 106 and resistor 104 can both be connected to a reference level other than ground, or connected separately to two different reference levels including ground.

Figure 4:
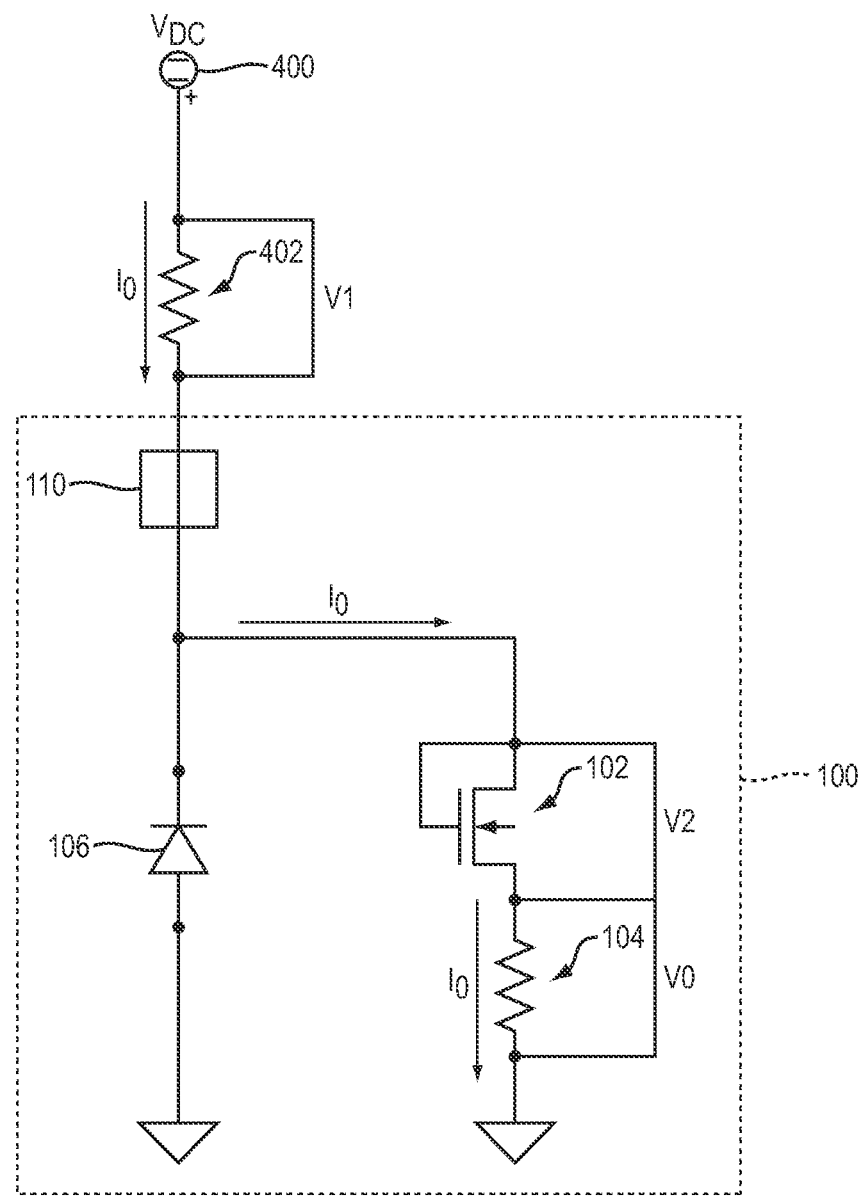
FIGS. 4 and 5 are schematic diagrams depicting one example of an external circuit connected to device identification and temperature sensor circuit 100 shown in FIG. 1.

FIG. 4 is a schematic diagram depicting one example of an external circuit connected to bond pad 110 shown in FIG. 1. Power supply 400 supplies a positive voltage $V_{dc}$ to bond pad 110 through a known resistor 402 (R1). The positive voltage at the cathode of temperature sensor diode 106 turns off the diode and turns on diode-connected transistor 102. The actual turn-on voltage of diode-connected transistor 102 depends upon the characteristics of diode-connected transistor 102, including the threshold voltage $V_t$. Diode-connected transistor 102 turns on because gate 316 and drain 314 are tied together. Therefore, a current $I_0$ flows only through diode-connected transistor 102 and resistor 104. The current $I_0$ is equal to $V_1/R_1$, where $V_1$ is the voltage across resistor 402 and $R_1$ is the resistance value of resistor 402. Since the impedance R2 of diode-connected transistor 102 is significantly smaller than the resistance value of resistor 104 in one embodiment, the voltage drop $V_2$ across diode-connected transistor 102 is negligible compared to the voltage drop $V_0$ across device identification resistor 104. Therefore, the resistance value of device identification resistor 104 can be calculated with the equation $(V_{dc}-V_1)/I_0$, or $R_1*(V_{dc}-V_1)/V_1$. Alternatively, in another embodiment, when the impedance R2 of transistor 102 is comparable to the resistance value of resistor 104, the resistance value of device identification resistor 104 can be calculated with the equation $(V_{dc}-V_1 V2)/I_0$, or $R_1*(V_{dc}-V_1)/V_1-R2$.

An integrated circuit that uses a device identification and temperature sensor circuit can be designed to have a specific resistance value for resistor 104. Individual integrated circuits have specific unique device identification resistance values for resistor 104. If a calculated resistance value for resistor 104 matches or substantially matches a known resistance value of an integrated circuit within a statistical margin of error, the identity or type of the integrated circuit can be determined based on the match between the calculated value and the known value of resistor 104. The known resistance value can be included in a list of predetermined resistance values for a variety of integrated circuits. By way of example only, the list can be implemented as a lookup table stored in a memory. An apparatus that includes the identified integrated circuit can then automatically select the correct hardware or software configuration for the identified integrated circuit, or perform operations specific for that integrated circuit.

Figure 5:
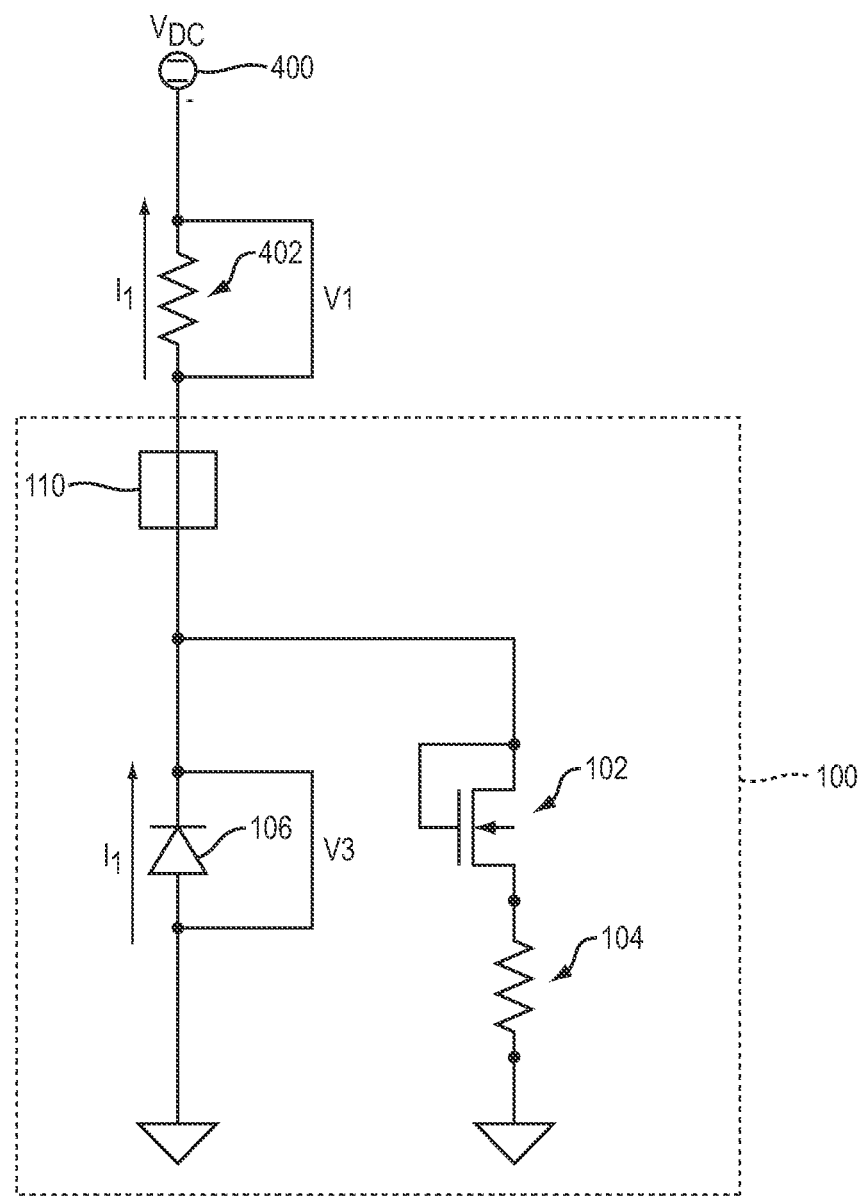

The operation of using the temperature sensor to measure temperature is shown in FIG. 5. When a negative voltage $(-V_{dc})$ is applied from power supply 400, the negative voltage will turn off diode-connected transistor 102 and prevent any current flow along the path of the device identification circuit which includes resistor 104. In the meantime, the negative voltage at the cathode of temperature sensor diode 106 will place the diode in a forward-biased state and a forward current $I_1$ will flow through diode 106 and through resistor 402. The current $I_1$ flowing through resistor 402 is calculated by $V_1/R_1$, where $V_1$ is the voltage across resistor 402 and $R_1$ is the resistance value of resistor 402. Since the drain region of the transistor 102 is n-type and the drain region is built inside a p-type well, there will be a forward-biased current flowing into the bond pad 110 as well when a negative voltage is applied from the power supply 400. Because the size of the temperature diode is much larger than the transistor 102 in one embodiment, the current flowing from the drain region of the transistor 102 is much smaller than the current flowing from the temperature diode. Therefore, the current $I_1$ is close to the current flowing through temperature sensor diode 106. The voltage $V_3$ across temperature sensor diode 106 can then be calculated by subtracting $V_1$ from $(-V_{dc})$. Therefore, since the relationship between $I_1$ and $V_3$ across temperature sensor diode 106 is temperature dependent, the temperature can be determined by comparing the data set $(I_1, V_3)$ with data sets determined at different temperatures. The data sets are pre-determined and stored in a memory (not shown) in an embodiment in accordance with the invention. By way of example only, the pre-determined data sets can be stored in a look-up table, which is described in more detail in conjunction with FIGS. 6-9.

Device identification and temperature sensor circuit is designed so that only one of the two elements in circuit 100 is turned on and operating at any given time. The threshold voltage of the diode-connected transistor 102 is designed to be positively away from zero in an embodiment in accordance with the invention. For example, the threshold voltage can be designed to be one volt above the zero, so that the impact of the leakage current of diode-connected transistor 102 upon the temperature measurement is small and insignificant when the voltage becomes negative. One method to increase the threshold voltage of diode-connected transistor 102 is to implant a different type of dopant into the channel. For a NMOS transistor, the dopant can be boron in an embodiment in accordance with the invention.

The device identification circuit 101 and the temperature sensor 106 are adapted such that only one circuit is operating in an ON state when the other circuit is in an "OFF" state. The device identification circuit 101 and the temperature sensor diode 106 are adapted such that both circuits are not simultaneously operating in an ON state. When a circuit is in the "OFF" state, the impact or effect of the circuit in the "OFF" state on the circuit in the "ON" state is minimized. The circuit in the "ON" state is in a state where the circuit will be used to determine a temperature, or to determine a voltage or current for identification purposes. The device identification circuit 101 has a first polarity and the temperature sensor has a second different polarity, where polarity is defined as a positive voltage change or a negative voltage change relative to a reference voltage.

Once a device is identified using the device identification circuit 101, temperature sensor diode 106 can periodically or continuously monitor the temperature of the integrated circuit while the integrated circuit is operating. For example, when the integrated circuit is an image sensor that is included in a security camera, the security camera can monitor the temperature of the image sensor while capturing images or video. If the temperature of the image sensor rises above a threshold indicating the temperature is too high, the camera can shut down automatically for a period of time to prevent damage to the image sensor due to high temperature.

Figure 6:
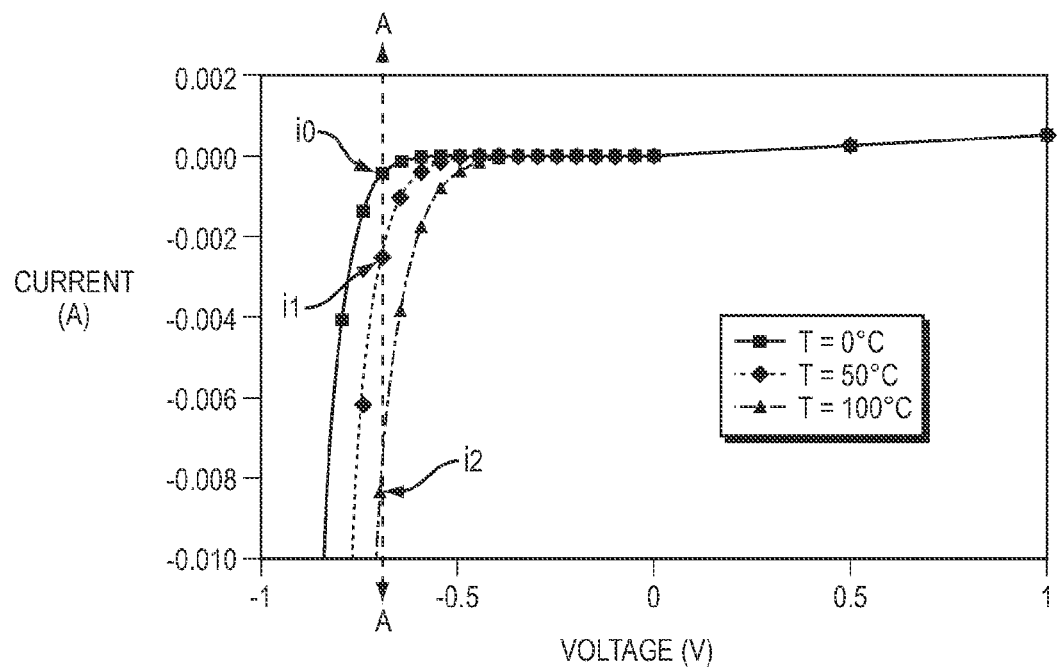
FIG. 6 is a simulated I-V curves based on the circuit shown in FIGS. 4 and 5 in an embodiment in accordance with the invention.
Figure 7:
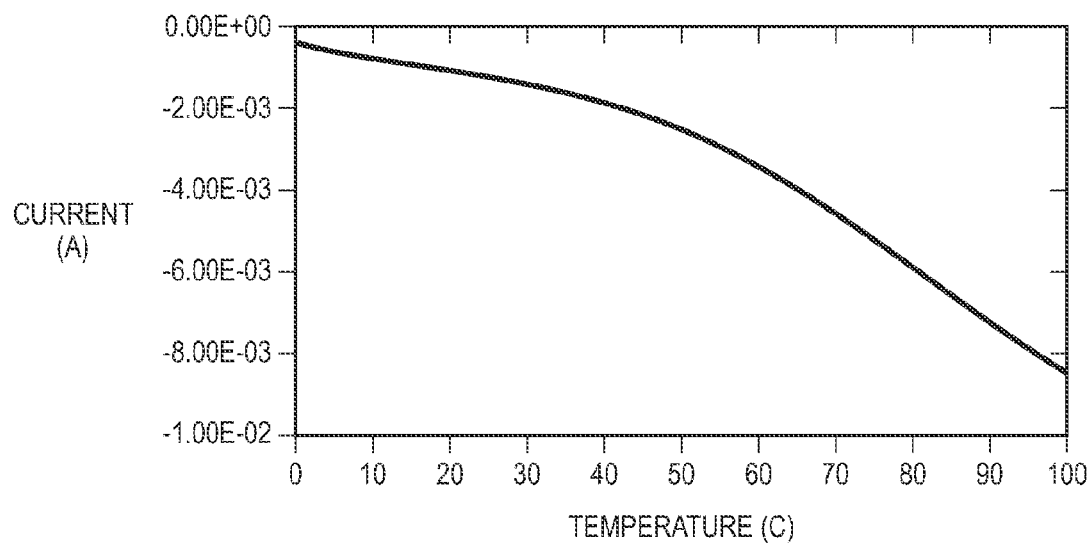
FIG. 7 depicts a relationship between diode current and temperature along line A-A in FIG. 6 in an embodiment in accordance with the invention.

FIG. 6 illustrates simulated I-V curves that are based on the circuit shown in FIGS. 4 and 5. One method that can be used to determine the temperature of an integrated circuit using temperature sensor diode 106 is to compare different current values obtained at a constant voltage. The current values at different temperatures are obtained along the vertical line A-A when the voltage is constant at −0.7V. FIG. 7 shows the relationship between the diode current and the temperature when the voltage is at −0.7V in an embodiment in accordance with the invention. The current values in curve 700 can be compared against a measured current and the temperature of the integrated device is determined by matching or identifying a corresponding current value with the measured current.

The current values can be included in a look-up table saved in a memory. For example, if the integrated circuit is an image sensor, the look-up table can be saved in a memory in an image capture device. When the temperature is to be measured, the diode current can be calculated using the method described earlier. Then the temperature of the image sensor can be obtained by matching the diode current with one of the diode currents stored in the lookup table. If a current falls in between two current values in the look-up table, a linear interpretation will be performed to get the temperature value in an embodiment in accordance with the invention.

Figure 8:
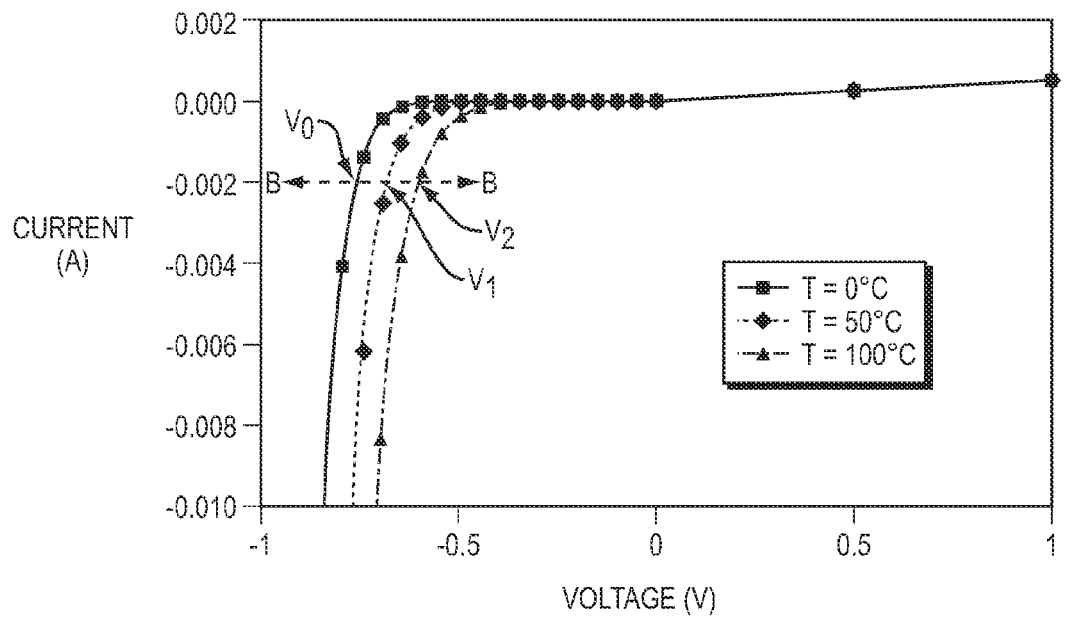
FIG. 8 depicts a relationship between diode current and temperature for different voltages at different temperatures obtained along line B-B in an embodiment in accordance with the invention.
Figure 9:
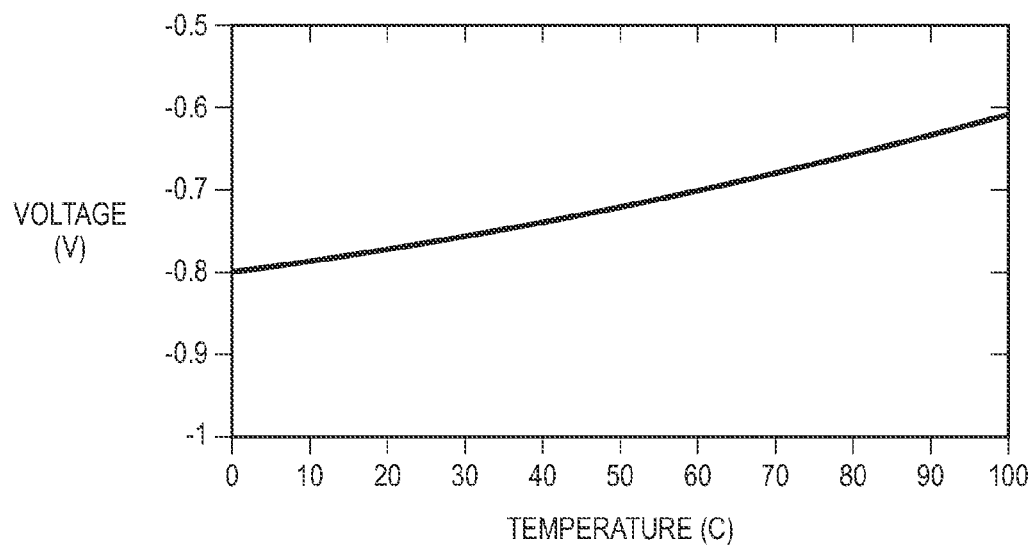
FIG. 9 depicts the relationship between the diode current and the diode temperature when the current is at the particular current represented by line B-B in FIG. 8.

Another method that can be used to determine temperature is to compare different voltages at a constant current. FIG. 8 depicts a relationship between diode current and temperature for different voltages at different temperatures obtained along line B-B in an embodiment in accordance with the invention. The voltage values at different temperatures are obtained along the vertical line B-B when the current of the power supply is constant at −0.002 A. FIG. 9 shows the relationship between the diode voltage and the diode temperature when the current is −0.002 A. Therefore, when the temperature is to be measured, the diode voltage can be calculated using the method described earlier and the temperature of the image sensor can be obtained by matching or determining a corresponding voltage value stored in the lookup table with the calculated diode voltage. If a voltage falls in between two voltage values, a linear interpretation will be performed to get the temperature value in an embodiment in accordance with the invention.

Temperature sensor diode 106 and diode-connected transistor 102 are designed so that when diode-connected transistor 102 is in an ON state, the leakage current from temperature sensor diode 106 is small compared to the current $I_0$ flowing through the diode-connected transistor 102 and resistor 104 in an embodiment in accordance with the invention. In addition, transistor 102 has lower impedance compared to the resistance value of resistor 104, allowing the calculation of the resistance of resistor 104 to be accurate.

Figure 10:
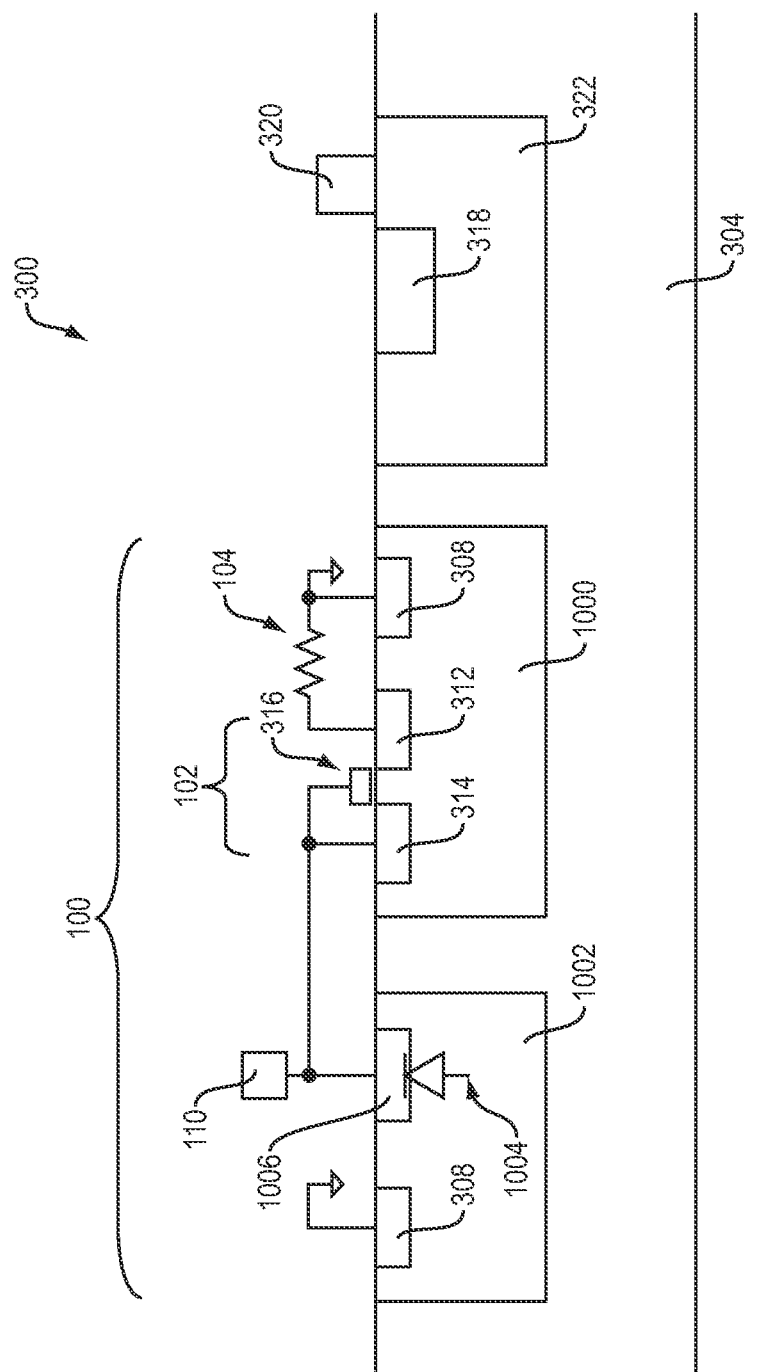
FIG. 10 is a cross-sectional view of a portion of a second integrated circuit that includes device identification and temperature sensor circuit 100 in an embodiment in accordance with the invention.

FIG. 10 is a cross-sectional view of a portion of a second integrated circuit that includes device identification and temperature sensor circuit 100 in an embodiment in accordance with the invention. The integrated circuit shown in FIG. 10 is identical to the integrated circuit of FIG. 3 except the p-type well 302 in FIG. 3 is replaced with two separate individual p-type wells 1000 and 1002. The p-type well 1000 is used to form the temperature sensor diode 106 and the p-type well 1002 is used to form the diode-connected transistor 102. The separate wells 1000, 1002 can reduce the crosstalk between the temperature sensor diode 106 and diode-connected transistor 102. The temperature sensor diode 1004 is formed by the p-type well 1000 and n-select region 1006. Both p-wells 1000, 10002 are tied to ground through p-select region 308.

Figure 11:
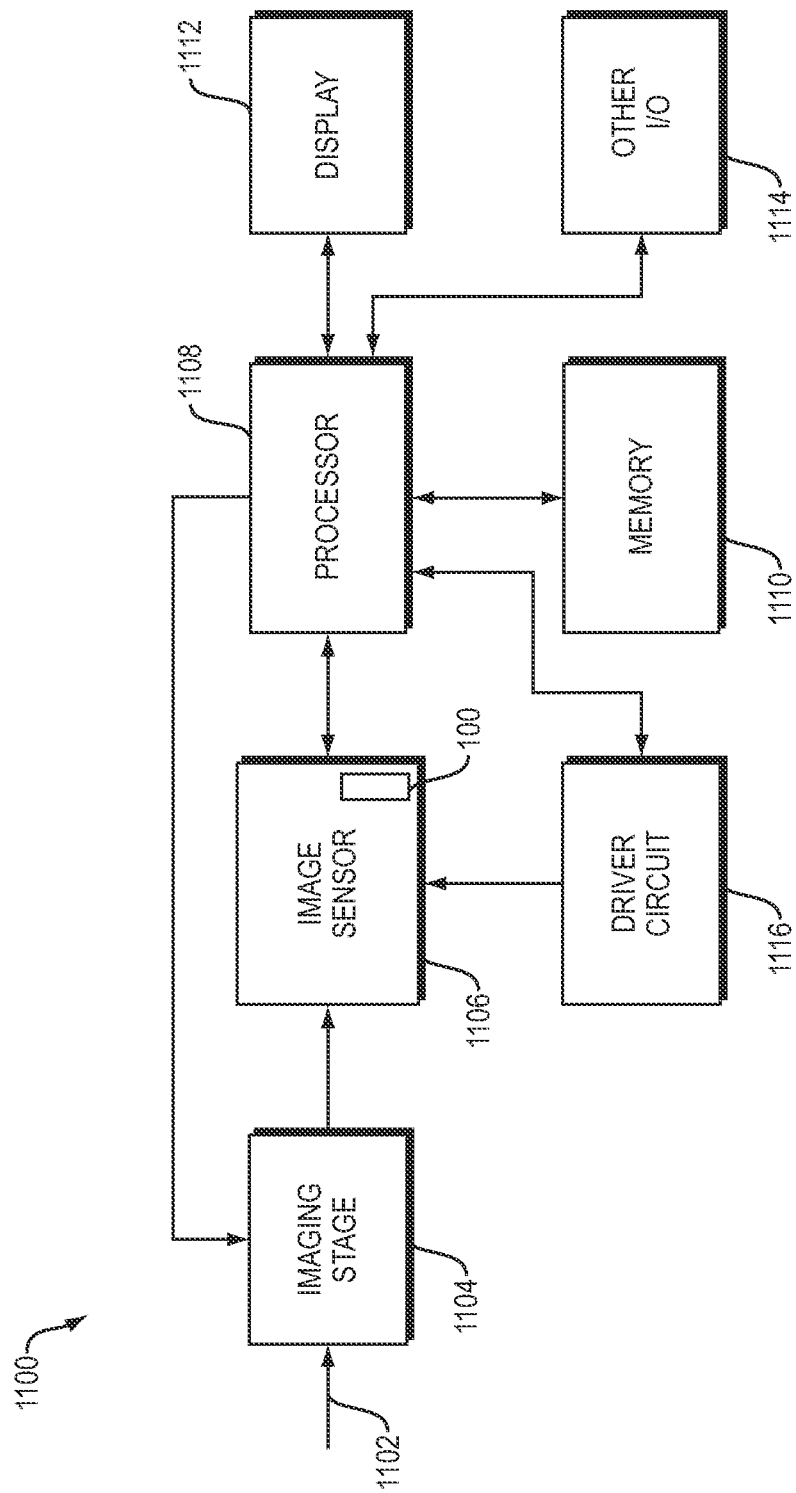
FIG. 11 is a simplified block diagram of an image capture device in an embodiment in accordance with the invention.

Referring now to FIG. 11, there is shown a simplified block diagram of an image capture device in an embodiment in accordance with the invention. Image capture device 1100 is implemented as a digital camera in FIG. 11. Those skilled in the art will recognize that a digital camera is only one example of an image capture device that can utilize an image sensor incorporating the present invention. Other types of image capture devices, such as, for example, cell phone cameras, digital video camcorders, and other hand-held devices can be used with the present invention.

In digital camera 1100, light 1102 from a subject scene is input to an imaging stage 1104. Imaging stage 1104 can include conventional elements such as a lens, a neutral density filter, an iris and a shutter. Light 1102 is focused by imaging stage 1104 to form an image on image sensor 1106. Image sensor 1106 captures one or more images by converting the incident light into electrical signals. By way of examples only, image sensor 1106 can be implemented as a CCD image sensor or a CMOS image sensor. Image sensor 1106 includes device identification and temperature sensor circuit 100 shown in FIG. 1.

Digital camera 1100 further includes processor 1108, memory 1110, display 1112, and one or more additional input/output (I/O) elements 1114. Although shown as separate elements in the embodiment of FIG. 11, imaging stage 1104 may be integrated with image sensor 1106, and possibly one or more additional elements of digital camera 1100, to form a compact camera module.

Processor 1108 may be implemented, for example, as a microprocessor, a central processing unit (CPU), an application-specific integrated circuit (ASIC), a digital signal processor (DSP), or other processing device, or combinations of multiple such devices. Various elements of imaging stage 1104 and image sensor 1106 can be controlled by timing signals or other signals supplied from processor 1108.

Memory 1110 can be configured as any type of memory, such as, for example, random access memory (RAM), read-only memory (ROM), Flash memory, disk-based memory, removable memory, or other types of storage elements, in any combination. Memory 1110 can store the list of known resistance values and integrated circuits that correspond to the resistance values that can be used when identifying an integrated circuit.

A given image captured by image sensor 1106 may be stored by processor 1108 in memory 1110 and presented on display 1112. Display 1112 is typically an active matrix color liquid crystal display (LCD), although other types of displays may be used. The additional I/O elements 1114 may include, for example, various on-screen controls, buttons or other user interfaces, network interfaces, or memory card interfaces, or even voice command controls.

Driver circuit 1116 includes a power supply and a resistor (not shown) in an embodiment in accordance with the invention. The power supply and resistor can be implemented as $V_{DC}$ and resistor 402 shown in FIGS. 4 and 5. Thus, the power supply is used to apply voltages to common node 108 (FIG. 1).

Processor 1108 controls driver circuit 1116 to either calculate a resistance value of the resistor (i.e., resistor 104 in FIG. 1) in device identification circuit by sourcing a positive voltage or to measure the temperature of image sensor 1106 by sourcing a negative voltage. Once the resistance value of the resistor (i.e., resistor 104) in the device identification circuit is determined, processor 1108 can recognize image sensor 1106 and set up the correct camera file and timing for image sensor 1106 automatically. By controlling driver circuit 1116, processor 1108 can continuously or periodically monitor the temperature of image sensor 1106 using device identification and temperature sensor circuit 100 and predetermined data sets stored in memory 1110. Based on the temperature measured, processor 1108 can control driver circuit 1116 to operate the image sensor 1106 accordingly. For example, if the temperature of image sensor 1106 is too high, processor 1108 can control driver circuit 1116 to turn off the power supply to the image sensor 1106 to prevent any damage to image sensor 1106 or to start a cooling process if there is a cooler attached to image sensor 1106. In addition, processor 1108 can perform one or more algorithms to improve the image quality related to the temperature. One example of an algorithm is to subtract dark current based on the temperature measurement from image signals since the dark current in the image sensor 1106 increases with temperature.

It is to be appreciated that the digital camera shown in FIG. 11 may comprise additional or alternative elements of a type known to those skilled in the art. For example, a thermoelectric cooling unit can be attached on the back of the image sensor 1106 inside the digital camera. The cooling unit can be used to cool the image sensor whenever it is needed based on the temperature reading. Elements not specifically shown or described herein may be selected from those known in the art. As noted previously, the present invention may be implemented in a wide variety of image capture devices. Also, certain aspects of the embodiments described herein may be implemented at least in part in the form of software executed by one or more processing elements of an image capture device. Such software can be implemented in a straightforward manner given the teachings provided herein, as will be appreciated by those skilled in the art.

The invention has been described in detail with particular reference to certain embodiments thereof, but it will be understood that variations and modifications can be effected within the spirit and scope of the invention. For example, the structure of the device identification and temperature sensor circuit has been described as having certain conductivity types. In particular, an NMOS transistor 102 built in a p-type well. However, other embodiments in accordance with the invention are not limited to this construction. The conductivity types can be reversed in other embodiments.

The identification resistor is described as made by polysilicon material, it is understood that other materials can also be used to make the resistor. In addition, both device identification resistor and temperature sensor are connected to ground, it is understood they can be tied to other reference voltage as well.

And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

1. An integrated circuit includes a device identification circuit that includes a resistor connected to a diode-connected transistor; and a temperature sensor diode connected in parallel with the device identification circuit, where the device identification circuit and the temperature sensor diode are adapted to not be simultaneously operating in an ON state. The impact or effect of the circuit in an "OFF" state on the circuit in the "ON" state is minimized.

2. The integrated circuit as in clause 1 where the integrated circuit comprises an image sensor.

3. An integrated circuit includes a device identification circuit that includes a resistor connected between a diode-connected transistor and a first reference voltage, where the diode-connected transistor has a first polarity applied to the first reference voltage; and a temperature sensor diode connected in parallel with the device identification circuit and having a second polarity applied to a second reference voltage.

4. The integrated circuit as in clause 3 where the integrated circuit comprises an image sensor.

5. A system to identify a device and to measure a temperature of the device, the system including a power supply electrically connected to a common node; a device identification circuit connected between the common node and a first reference voltage, where the device identification circuit includes a diode-connected transistor connected to a resistor with the diode-connected transistor having a first polarity and connected to the common node and the resistor connected between the diode-connected transistor and the first reference voltage; and a temperature sensor diode having a second polarity connected in parallel with the device identification circuit, where the temperature sensor diode is connected between the common node and a second reference voltage.

6. The system as in clause 5 further including a second resistor connected between the power supply and the common node.

7. The system as in clause 6 where the power supply and the second resistor are disposed in an image capture device.

8. The system as in clause 7 where the device identification circuit and the temperature sensor diode are disposed in an image sensor.

9. The system as in clause 5 further including a processor connected to the integrated circuit; a memory connected to the processor; and a driver circuit connected to the processor and to the integrated circuit.

10. A method for identifying an integrated circuit and determining a temperature of the integrated circuit using a circuit comprising device identification circuit that includes a resistor connected to a diode-connected transistor and a temperature sensor diode connected in parallel with the device identification circuit, where the device identification circuit and the temperature sensor diode are connected to a common node, the method including applying a first voltage to the common node to place the device identification circuit in an ON state and place the temperature sensor diode in an OFF state; identifying the integrated circuit; applying a second voltage to the common node to place the device identification circuit in an OFF state and place the temperature sensor diode in an ON state; and determining a temperature of the integrated circuit.

11. The method as in clause 10, where identifying the integrated circuit includes determining a resistance value of the resistor included in the device identification circuit; and determining a corresponding resistance value from a plurality of predetermined resistance values for different integrated circuits to the resistance value of the resistor.

12. The method as in clause 10 where determining a temperature of the integrated circuit includes measuring a current value through the temperature sensor diode; comparing the measured current value against a plurality of predetermined current values determined at different temperatures; and determining the temperature of the integrated circuit by determining one of the predetermined current values in the plurality of current values that correspond with the measured current value.

13. The method as in clause 10 where determining a temperature of the integrated circuit includes measuring a voltage value across the temperature sensor diode; comparing the measured voltage value against a plurality of predetermined voltage values determined at different temperatures; and determining the temperature of the integrated circuit by determining one of the predetermined voltage values in the plurality of voltage values that correspond with the measured current value.

14. The method as in clause 10 where the integrated circuit comprises an image sensor.

PARTS LIST 100 device identification and temperature sensor circuit
101 device identification circuit
102 diode-connected transistor
104 resistor
106 temperature sensor diode
108 common node
109 reference voltage
110 bond pad
111 reference voltage
300 integrated circuit
302 well
304 substrate
306 well
308 region
310 region
312 source region
314 drain region
316 gate of transistor
318 other circuit or component
320 other circuit or component
322 well
400 power supply
402 resistor
1000 well
1002 well
1004 temperature sensor diode
1006 region
1100 image capture device
1102 light
1104 imaging stage
1106 image sensor
1108 processor
1110 memory
1112 display
1114 other input/output (I/O) elements
1116 driver circuit

The invention claimed is:

1. An integrated circuit, comprising thereon:
a bond pad configured to receive a first signal and a second signal different than the first signal;
a device-identification circuit for identifying the integrated circuit, the device-identification circuit having a first polarity and being coupled to the bond pad; and
a temperature sensor connected in parallel with the device-identification circuit for determining a temperature of the integrated circuit, the temperature sensor having a second polarity that is different than the first polarity and being coupled to the bond pad;
the device-identification circuit being configured to operate in response to the second signal and the temperature sensor being configured to be nonoperational in response to the second signal; and
the temperature sensor being configured to operate in response to the first signal and the device identification circuit being configured to be nonoperational in response to the first signal.

2. The integrated circuit of claim 1, wherein the device-identification circuit comprises a resistor connected to a diode-connected transistor.

3. The integrated circuit of claim 2, wherein the temperature sensor is a diode.

4. The integrated circuit of claim 1, wherein the integrated circuit comprises an image sensor.

5. The integrated circuit of claim 1, wherein the first signal is a voltage and the second signal is a voltage.

6. The integrated circuit of claim 1, wherein the first signal is a positive voltage and the second signal is a negative voltage.

7. An integrated circuit, comprising thereon:
a bond pad;
a device identification circuit coupled to the bond pad and comprising a resistor connected between a diode-connected transistor and a first reference voltage, wherein the diode-connected transistor has a first polarity relative to the first reference voltage; and
a temperature sensor diode coupled to the bond pad and in parallel with the device identification circuit and having a second polarity relative to a second reference voltage, the second polarity being different than the first polarity.

8. The integrated circuit of claim 7, wherein the integrated circuit comprises an image sensor.

9. The integrated circuit of claim 7, wherein the first and second reference voltages are the same voltage.

10. The integrated circuit of claim 9, wherein the first and second reference voltages are ground.

11. A system for identifying a device and to measure its temperature, the system comprising:
a power supply;
a common node coupled to the power supply;
a device-identification circuit coupled to the common node; and
a temperature sensor in parallel with the device-identification circuit and coupled to the common node;
the device-identification circuit configured to be placed in an ON state in response to a first voltage and the temperature sensor being configured to be placed in an OFF state in response to the first voltage; and
the temperature sensor configured to be placed in an ON state in response to a second voltage and the device-identification circuit being configured to be placed in an OFF state in response to the second voltage; wherein the first and second voltages are of different polarity.

12. The system of claim 11, wherein the device identification circuit includes a diode-connected transistor connected to a resistor with the diode-connected transistor having a first polarity and connected to the common node and the resistor connected between the diode-connected transistor and a first reference voltage.

13. The system of claim 12, wherein the temperature sensor is a diode having a second polarity.

14. The system of claim 12, wherein the temperature sensor is coupled between the common node and a second reference voltage.

15. The system of claim 14, wherein the first and second reference voltages are the same voltage.

16. The system of claim 15, wherein the first and second reference voltages are ground.

17. The system of claim 11, further comprising a second resistor connected between the power supply and the common node.

18. The system of claim 17, wherein the power supply and the second resistor are disposed in an image-capture device.

19. The system of claim 18, wherein the device identification circuit and the temperature sensor diode are disposed in an image sensor.

20. The system of claim 11, further comprising:
a processor connected to the integrated circuit;
a memory connected to the processor; and
a driver circuit connected to the processor and to the integrated circuit.

21. The system of claim 20, wherein the memory contains a look-up table relating different resistance values to associated devices, the processor being configured to identify the device based on a substantial match between a value in the look-up table and a value of the identification-circuit resistor.

22. The system of claim 20, wherein the memory contains a look-up table relating different values of an electrical parameter of the temperature sensor to associated temperatures, the processor being configured to identify a device temperature based on a substantial match between a present value of the electrical parameter and a value in the look-up table.

23. The system of claim 22, wherein the sensor comprises a diode and the electrical parameter is current through the diode.

24. The system of claim 22, wherein the sensor comprises a diode and the electrical parameter is voltage across the diode.

* * * * *